United States Patent [19]

Sato

[11] 4,335,172

[45] Jun. 15, 1982

[54] PRESSURE SENSITIVE LABEL STRIP

[75] Inventor: Yo Sato, Tokyo, Japan

[73] Assignee: Kabushiki Kaisha Sato, Japan

[21] Appl. No.: 93,634

[22] Filed: Nov. 13, 1979

Related U.S. Application Data

[63] Continuation-in-part of Ser. No. 926,704, Jul. 20, 1978, Pat. No. 4,210,688, which is a continuation-in-part of Ser. No. 867,007, Jan. 5, 1978, abandoned.

[30] Foreign Application Priority Data

Nov. 14, 1978 [JP] Japan .......................... 53/155772[U]

[51] Int. Cl.³ ........................ G09F 3/00; B65D 65/30; B32B 3/16

[52] U.S. Cl. ...................................... 428/42; 428/136; 428/137; 428/906; 428/915; 40/2 R; 283/21; 206/820; 156/256

[58] Field of Search .................................... 428/40–42, 428/56, 134–137, 906, 916; 40/2 R; 283/18, 21; 206/390, 813, 820; 156/250, 256

[56] References Cited

U.S. PATENT DOCUMENTS

| | | | |
|---|---|---|---|
| 3,501,365 | 3/1970 | Marshall | 428/42 |
| 3,783,083 | 1/1974 | Jenkins | 428/42 |
| 3,852,139 | 12/1974 | Jenkins | 428/42 X |
| 3,863,761 | 2/1975 | LaMers | 428/78 X |
| 4,061,808 | 12/1977 | Sato | 428/40 X |
| 4,081,309 | 3/1978 | Jenkins | 428/42 X |
| 4,173,293 | 11/1979 | Hamisch et al. | 206/820 X |
| 4,210,688 | 7/1980 | Sato | 428/41 |

*Primary Examiner*—Marion McCamish
*Assistant Examiner*—Alexander S. Thomas
*Attorney, Agent, or Firm*—Ostrolenk, Faber, Gerb & Soffen

[57] ABSTRACT

A pressure sensitive label strip comprises a tape-like strip of label material that is overlaid on a tape-like strip of backing material. Parting cut lines extend transversely across the strip of label material at regular intervals to form a plurality of unit label pieces. Feeding cut lines are defined in the effective portions of each unit label piece except the marginal portion of the label piece to form first feeding tongues. Other feeding cut lines are defined in the backing material at the positions corresponding to the abovementioned feeding cut lines to form second feeding tongues which are of a different shape from that of the first feeding tongues.

9 Claims, 8 Drawing Figures

PRESSURE SENSITIVE LABEL STRIP

CROSS-REFERENCE TO RELATED APPLICATION

This is a continuation-in-part of Ser. No. 926,704, filed July 20, 1978, now U.S. Pat. No. 4,210,688, which is a continuation-in-part of Ser. No. 867,007, filed Jan. 5, 1978, now abandoned.

BACKGROUND OF THE INVENTION

1. Field of the Invention

This invention relates to a tape-like, pressure sensitive label strip for use in a hand-held label printing and dispensing machine (hereinafter referred to as a "label printing machine"). More particularly, the invention relates to the feeding cuts in the label strip by means of which the label strip is advanced through the label printing machine when the feeding cuts are engaged by feeding pins formed on a feeding roller. These feeding cut lines may also serve for preventing the unauthorized switching of labels.

2. Description of the Prior Art

The conventional pressure sensitive label strip comprises a long, thin strip layer of label material having an adhesive coating layer on its underside and a long, thin strip layer of backing material having a releasing agent coating layer on its top side. The strip of label material has a plurality of transverse parting cut lines which define unit label pieces between these parting cut lines. Feeding cut lines are formed across each parting cut line in the label material for defining small tabs. At the positions corresponding to the feeding cut lines, additional feeding cut lines are defined in the backing material. Such a label strip according to the prior art can be easily advanced through a label printing machine.

When the respective feeding cut lines of the label material and the backing material are brought into engagement with the feeding pins of the feeding roller in a label printing machine, the pins force the tabs to stand up out of the plane of the strip. After that, the erected feeding tabs, or tongues, are depressed flat by a label correcting member which is attached to the printing head, and the label strip is advanced into the printing section. The label material is then printed. One drawback of this arrangement is that each erected tongue of the backing material is often pressed down over the front edge portion of a label during the flattening of the erected feeding tongue because the feeding cut line of the backing material is located just underneath the parting cut line of the label material. The overlapped portion in the front side of the unit label piece cannot be printed.

Each printed label material is then peeled off from the backing material and the peeled label is applied to the surface of merchandise. During this operation, the feeding tongue is liable to be erected again. Erected tongues on the front and rear edges of a label can be flattened by rubbing them with an applicator roller upon their being applied to merchandise, but an erected feeding tongue on the front side is often left standing because it is outside the range of the applicator roller. As a result, the appearance of the label is unsatisfactory and, in addition, it is easy to grasp the tongue to switch labels or merchandise.

SUMMARY OF THE INVENTION

It is the principal object of the present invention to provide an improved label strip with feeding tongues.

It is another object of the present invention to provide such a label strip which prevents the occurrence of unprinted portions in the marginal portions of the labels.

Another object of the present invention is to provide a pressure sensitive label strip which gives labels a good appearance without the occurrence of erected feeding tongues when the labels thereof are applied to the surface of an article.

A further object of the present invention is to provide a pressure sensitive label strip with cuts to prevent the unauthorized switching of labels.

Still a further object of the present invention is to provide a pressure sensitive label strip which is simple in structure and which can be mass-produced without difficulty.

In accordance with the present invention, a pressure sensitive label strip comprises a tape-like strip of label material having an adhesive coating layer on its underside and a tape-like strip of backing material having a release layer on its top side. The strip of label material is temporarily overlaid on and attached to the strip of backing material. Parting cut lines extend transversely across the strip of label material. The parting cut lines are spaced at regular intervals to divide the label strip material into a plurality of unit label pieces. The unit label pieces can be peeled off from the strip of backing material by bending the backing material away from the label material.

The improvement in the pressure sensitive label strip of the invention is characterized in that at least one feeding cut line defining a feeding tongue is provided in the interior of each unit label piece (hereinafter referred to as "effective area"), rather than in the periphery thereof and additional feeding cut lines are provided in the backing material. The latter feeding cut lines have a shape which is different from the shape of those in the label material.

Each feeding cut line in the label material is generally of V-shape and each feeding cut line in the backing material is generally of a U-shape. Thus, the feeding cut lines in both the label material and the backing material define respective tongues there. The top end portions or webs of the generally V-shaped feeding cut lines of the label material and also of the generally U-shaped feeding cut lines of the backing material are oriented contrary to the direction of the advance of the label strip. The shapes of the feeding cut lines are selected so that each tongue defined by a feeding cut line in the label material has a greater surface area than the surface area of the respective overlaid tongue defined by a feeding cut line in the backing material.

BRIEF DESCRIPTION OF THE DRAWINGS

Other objects and features of the present invention will be apparent from the following description of the invention with reference to the accompanying drawings, in which like reference characters refer to like elements, and in which.

DESCRIPTION OF THE PREFERRED EMBODIMENTS

In order to explain the present invention more clearly, a label strip according to the prior art will first be described. A description of the prior art now discussed can be found in U.S. Ser. No. 926,704 filed July 20, 1978, now U.S. Pat. No. 4,210,688.

Figure 8:
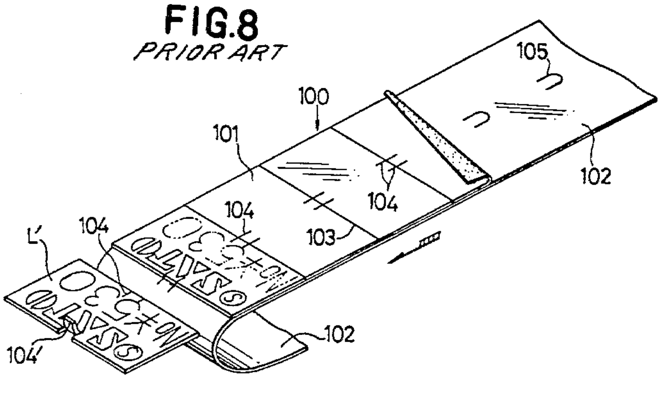
FIG.8 PRIOR ART
FIG. 8 is a perspective view of an example of a label strip according to the prior art.

As shown in FIG. 8 of the present invention, the conventional pressure sensitive label strip 100 comprises a long, thin strip layer of label material 101 having an adhesive coating layer on its undersurface, which is attached face-to-face to the upper surface of a long, thin strip layer of backing material 102 having a releasing agent coating layer. The strip of label material 101 has a plurality of transverse parting cut lines 103 that are spaced at regular intervals along its length, defining unit label pieces L′ formed between these parting cut lines 103. A pair of feeding cut lines 104 cross each parting cut line 103. At the positions corresponding to the feeding cut lines 104, generally U-shaped feeding cut lines 105 are defined in the backing material.

The label strip 100 in which the feeding cut lines 104 cross the parting cut lines 103 can be smoothly brought into engagement with feeding pins disposed around a feeding roller when the label strip 100 is passed through a label printing machine.

The respective feeding cut lines 104 and 105 of label material 101 and backing material 102 are temporarily made to stand up when brought into engagement with the feeding pins of the feeding roller in a label printing machine. The erected feeding tongues are then depressed flat by a label correcting member 32 (see FIG. 4) attached to the printing head, and the label strip 100 is advanced into the printing section and printed. The erected tongues of the backing material 102, however, are often pressed down over the front edge portion of a respective unit label piece L′ of the label material 101 during the correction of the erected tongue of the feeding cut line 105 because the feeding cut line 105 of the backing material 102 corresponds exactly to and is located directly under the parting cut line 103 of the label material 101. The portion of the front side of the unit label piece 1″ covered by the tongue cannot be printed.

The printed label material 101 is then peeled off from the backing material 102 by bending the backing material 102 rearward, and the peeled unit label piece L′ is applied to the surface of merchandise. In this operation, the feeding tongue of label L′ is liable to be erected again into the tongue 104′. The erected tongues on the front and rear edges of the unit label piece L′ can be flattened by rubbing them with an applicator roller 34 (see FIG. 4) when it is applied to an article, but the tongue piece 104′ on the front side is often left standing since it lies outside the range of the applicator roller 34. Such a label is unsatisfactory in appearance and in addition, is easy to remove, allowing labels to be switched easily without authorization.

The improved label strip of the present invention does not suffer from the above-described disadvantage of the label strip of the prior art, as will be described in detail.

Figure 1:
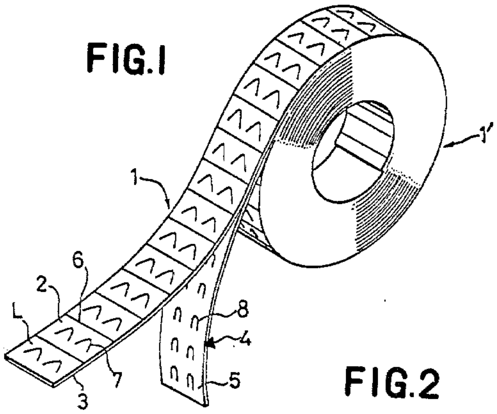
FIG. 1 is a perspective view of one embodiment of the pressure sensitive label strip of the invention, wherein the label strip is shown rolled up.
Figure 2:
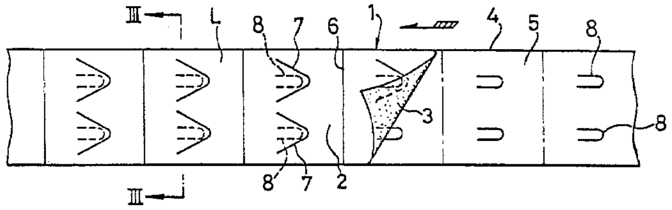
FIG. 2 is an enlarged plan view of a fragment of the same label strip.
Figure 3:
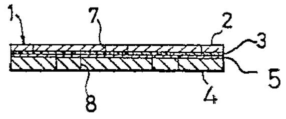
FIG. 3 is a vertical cross-sectional view of the same label strip, taken on the line III—III in FIG. 2.

In the first embodiment shown in FIGS. 1 to 3, inclusive, the label strip 1 comprises a long, thin strip layer of label material 2 and a long, thin strip layer of backing material 4. The strip of label material 2 and the strip of backing material 4 are put together in face-to-face layers. The rear surface of the label material 2 is provided with a release layer 5, such as a layer of silicone, to facilitate the peeling of the temporarily stuck label material 2 from the backing material 4.

The strip of label material 2 has a plurality of transverse parting cut lines 6 spaced at regular intervals along its length, defining unit label pieces L. In each label L are defined a pair of feeding cut lines 7, which are generally in the shape of a V. The feeding cut lines 7 are disposed in about the middle portion of each label L and are positioned side by side in the direction perpendicular to the length of the label strip 1. More broadly, the pair of feeding cut lines 7 are defined in the inside area of each unit label piece L away from the marginal portions thereof. Other feeding cut lines 8 in the shape of a U are defined in the backing material 4 at positions corresponding to the positions of the feeding cut lines 7 of the label material 2. The shape of the feeding cut lines 8 of the backing material 4 is different from the shape of the feeding cut lines 7 of the label material 2, so that the combination of the two sets of feeding cut lines are not through cut lines. The feeding cut lines 7 and 8 are oriented contrary to the direction of the advance of the label strip 1. Finally, the shapes of the feeding cut lines 7, 8 are selected so that each tongue 7′ (described further in connection with FIG. 5) defined by a feeding cut line 7 in the label material 2 has a greater surface area than the surface area of the respective overlaid tongue 8′ defined by a feeding cut line 8 in the backing material 4.

Figure 5:
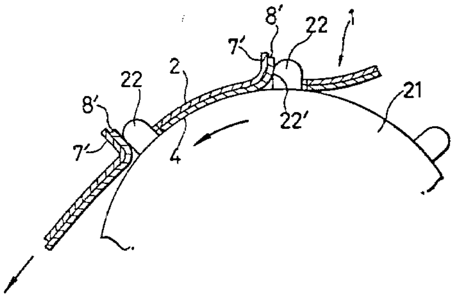
FIG. 5 is a schematic cross-sectional view showing the engagement of the label strip with the feeding pins.
Figure 4:
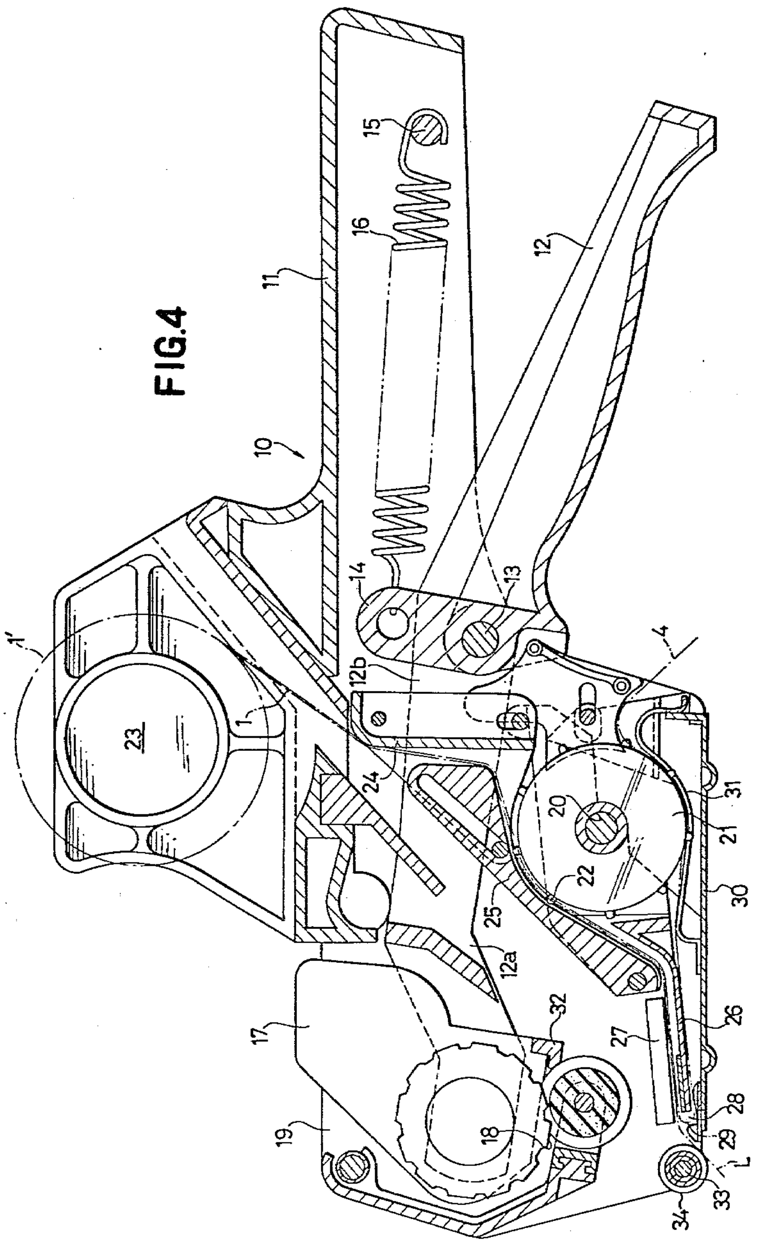
FIG. 4 is a vertical cross-sectional view of a label printing machine with which the label strip of the present invention can be applied.

The tape-like label strip 1 of the present invention is set to the main body 10 of a label printing machine as shown in FIGS. 4 and 5. The process of advancing the tape 1 and peeling the labels off is now described.

The label printing machine shown in FIG. 4 comprises a hand lever 12 that is pivotally secured to a pivot shaft 13 that is fitted to the opposed, spaced apart machine frames 19 disposed on both sides of it. An integrally formed hand grip 11 extends rearwardly from the frames 19. A return spring 16 is stretched between spring supporting members 14 and 15 that are respectively formed on the hand lever 12 and the hand grip 11. The force of spring 16 returns the hand lever 12 to the original downward rest position when the lever is released after it has been squeezed.

The hand lever 12 extends forward (to the left in the drawing) of its support shaft 13, and this section of the hand lever 12 comprises a printing section 12*a* remote from shaft 13 and an actuating section 12*b* nearer to the shaft 13. The printing section 12*a* carries a printing head 17 which is provided with a plurality of types 18 which can be selected by turning stamp wheels or stamp belts. The actuating section 12*b* is provided with a known sector drive gear (not shown) near the pivot shaft 13.

A main shaft 20, which is attached to the pair of machine frames 19, rotatably supports a feeding roller 21 having a pawl wheel (not shown) that is engaged with the drive gear of the actuating section 12b of the hand lever 12. The circumferential surface of the feeding roller 21 is provided with a plurality of feeding pins 22 that are spaced at regular intervals for advancing the tape-like label strip 1 of the present invention that is comprised of the label material 2 and the backing material 4.

When the label strip 1 is advanced through the label printing machine, a rolled label strip 1′ is supported by a label strip supporting section 23 of the machine. The free end of the unrolling label strip 1 is passed through the space between the feeding roller 21 and a label pushing member 25 by way of a label guide member 24. The free end of the label strip 1 is further led onto a platen 26 which is supported inside the machine frame in opposition to the printing head 17. In this advancing of the label strip 1, the feeding cut lines 8 and 7 in the strip of the backing material 4 and of the label material 2 are brought into engagement with the feeding pins 22 on the feeding roller 21, and the label pushing member 25 is then fitted over the upper surface of the label strip 1.

When the hand lever 12 is released after it is squeezed, the feeding roller 21 is turned counterclockwise by the length of one label piece. This correspondingly advances the label strip 1 by the length of one label since the label strip engages with the feeding pins 22 on the feeding roller 21. During the advancing of the label strip 1, as shown in FIG. 5, as each of the feeding cut lines 8 of the backing material 4 engages a feeding pin 22, it is raised up by the feeding pin 22 to form feeding tongue 8′. When each feeding tongue 8′ is bent upright, it comes into surface contact with the flat feeding face 22′ of the feeding pin 22. Therefore, any instability in feeding owing to concentrated loading can be eliminated by distributing the load throughout the entire contacting surfaces. As a feeding pin 22 lifts a feeding tongue 8′ of the backing material 4, it is also inserted into the feeding cut line 7 of the label material 2, and the feeding pin 22 also lifts the feeding tongue 7′. The pushing force of the feeding pin 22 can be borne by both of the feeding tongues 7′ and 8′ when the label strip 1 is advanced.

The label strip 1 that is in engagement with the feeding pins 22 is then intermittently advanced onto the platen 26 by the squeezing and releasing operation of the hand lever 12.

The feeding tongues 7′ and 8′ of the label strip 1 are stood up by the above feeding pins 22. But, when the printing head 17 is moved down to the platen 26 by squeezing the hand lever 12, the erected feeding tongues 7′ and 8′ are flattened simultaneously with the printing of the preceding unit label piece. More particularly, the label correcting member 32 that is disposed at the rear end of the printing head 17 presses down the label strip 1 on the platen 26 to depress the erected feeding tongues 7′ and 8′ into the original flat position. This corrective action is performed one pitch before the above printing action.

The feeding cut lines 7 and 8 of the label strip 1 that are in engagement with the feeding pins 22 of the feeding roller 21 do not cross the parting cut lines 6 between unit label pieces L, and the generally U-shaped feeding tongues 8′ of the backing material 4 are smaller than the wide-angled V-shaped feeding tongues 7′ of the label material 2. As a result, the feeding tongues 8′ are not folded over the label material 2 in the corrective operation, which prevents the occurrence of unprinted portion.

After the printing step, the layer of backing material 4 of the label strip 1 is shifted in front of the platen 26 and is bent downward and rearward, forming a bending portion 29 of a loop in the narrow space 28 between a keep plate 27 and a bottom cover 30 beneath the platen 26. Once it is bent rearward, the backing material 4 is further led rearward and is brought into engagement with the feeding pins 22 on the underside of the feeding roller 21. Two label pushing members 31 are attached on the inside of the bottom cover 30. Thus, both side edge portions of the backing strip 4 are pressed against the feeding roller 21, and the backing strip 4 is brought into engagement with the feeding pins 22 of the feeding roller 21 so as to be passed out from the rear portion of the machine body by the intermittent rotation of the feeding roller 21.

The printed label material 2 is peeled from the bending portion 29 of the backing material 4 in the form of single labels L. As a result of the bending of the backing material 4, the feeding tongue 7′ of the label material 2 becomes upright temporarily. This can be corrected by the pressing on the labels of an applicator roller 34 which is rotatably attached to the shaft 33 in the lower front portion of the machine body. In this case, since the feeding cut line 7 is positioned almost in the middle of the unit label piece L, the erected feeding tongue 7′ can be completely corrected by rolling the applicator roller from the front or leading edge to the rear or trailing edge of the label.

In contrast, in the case of the prior art label strip 100 shown in FIG. 8, the feeding tongues 104′ between the feeding cut lines 104 are erected on the front and rear edges of a label L′. Although the erected feeding tongue 104′ on the rear edge of the unit label piece L′ can be corrected by using the above-mentioned applicator roller 34, the erected feeding tongue 104′ on the front edge is outside the range of the roller 34, and in any event it stands up contrary to the direction of the rolling of the roller 34. As a result, the feeding tongue 104′ on the front edge of the label L′ cannot be corrected and is left as it stands on merchandise.

Figure 6:
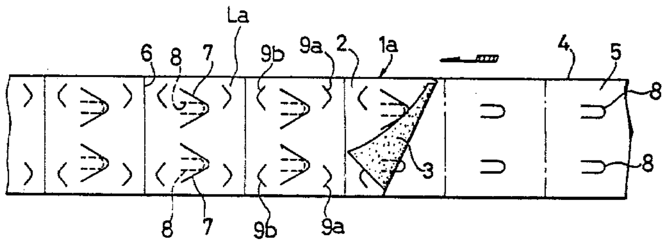
FIG. 6 is an enlarged plan view of a fragment of a second embodiment of a label strip according to the present invention.

The second embodiment of the label strip of the present invention is shown in FIG. 6. The construction of the feeding cut lines 7 of the label material 2 and that of the feeding cut lines 8 of the backing material are the same as those of the first embodiment. In the unit label piece La of this embodiment, two pairs of wide-angled V-shaped cuts 9a and 9b for preventing unauthorized switching of labels are defined, one pair to either side of the feeding cut lines 7. One pair of the label switching preventive cuts 9a, in the rear portion of the label La, are pointed rearwardly like the V-shape of the feeding cut lines 7, while the other pair of such cuts 9b are pointed in the opposite direction.

After the label La is applied to merchandise, the above-described wide-angled generally V-shaped feeding cut lines 7 of the label material 2 are effective for preventing the switching of labels. However, if cuts 9a and 9b are additionally defined in the label material and the top ends of the cuts 9a to the rear of the label La are pointed in one direction, and the cuts 9b are pointed in the opposite direction, the switching of labels can be prevented more effectively. When a label La has been applied to merchandise, the label La is generally peeled off the merchandise from one side, and the tabs defined by either the cuts *9a* or the cuts *9b*, whichever point contrary to the direction of peeling, are torn away.

Figure 7:
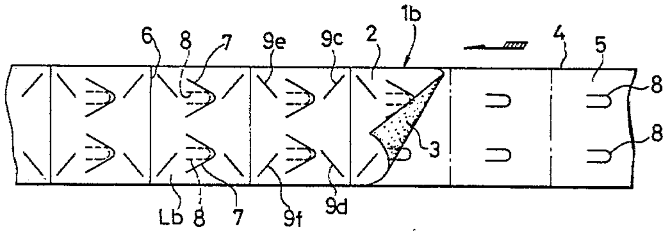
FIG. 7 is an enlarged plan view of a fragment of a third embodiment of a label strip according to the present invention.

The third embodiment of the label strip 1 of the present invention is shown in FIG. 7. The feeding cuts 7 and 8 of the label material 2 and the backing material 4 are the same as those of the first embodiment. In this embodiment, cut lines 9c to 9f for preventing switching of labels are provided only in the label material 2. These cuts 9c–f are short, slanted cut lines which run in the direction from the center of the label Lb toward the respective corners thereof.

When a person tries to peel off a label Lb that has been applied to merchandise, at least one of the cuts 9c to 9f is also torn. Switching of labels thus becomes quite difficult.

Since the feeding cut lines 7 and 8 of the label material 2 and the backing material 4 are pointed contrary to the direction of the advance of the label strip 1 in the label printing machine, the end portions of the feeding cut lines 7 and 8 will not be torn, because of the inertia of the advancing movement in the front end portion of the platen 26. Moreover, the feeding tongue 8' is not re-erected after the rearward bending of the backing material 4 but is maintained flat. As a result, the backing material 4 can be smoothly passed through the tapered narrow space between the platen 26 and the bottom cover 30 of the machine body. Accordingly, the label strip of the present invention is also quite effective for avoiding the tearing of feeding tongue portions of the backing material 4.

In the label strip of the present invention, the feeding cut lines to form the feeding tongues are defined in the effective area of the label material. Therefore, unprinted portions in the marginal portions of the label do not occur. In addition, the feeding tongues that are erected when the label is peeled off from the backing material can be flattened by pressing the applicator roller against the surface of the label that is applied to an article.

Accordingly, not only is the label of the present invention esthetically pleasing, but it cannot be switched with another label, since no feeding tongues are left erect. Moreover, since the feeding cut lines have a wide-angled V-shape, the label is liable to be torn away from the feeding cut portions if it is peeled off the article to which it has been affixed.

Although the present invention has been described in connection with several perferred embodiments thereof, many variations and modifications will now be apparent to those skilled in the art. The scope of the present invention, accordingly, is to be limited not by the details of the above description, but only by the terms of the appended claims.

What is claimed is:

1. A pressure sensitive label strip comprising:

a tape-like strip of label material, said label material strip being divided by transverse parting lines into a plurality of individual label pieces, each said label piece having a periphery and having at least one feeding cut line provided elsewhere than in said periphery of said label piece; and a tape-like strip of backing material, said strip of label material being releasably adhered to one surface of said strip of backing material, said backing material strip being provided with at least one feeding cut line corresponding to and generally in registry with to be overlaid by a respective said feeding cut line in said label material strip, said feeding cut line in said backing material strip having a shape different from the shape of said feeding cut line in said label material strip, each of said feeding cut lines defines a tongue in its respective said strip, and each of said tongues defined by said feeding cut lines in said label material strip has a greater surface area than the respective said tongue defined by said feeding cut lines in said backing material strip.

2. The label strip of claim 1, wherein each of said feeding cut lines in said label material strip is generally of a V-shape and each of said feeding cut lines of said backing material is of a generally U-shape.

3. The label strip of either of claims 1 or 2, wherein the respective feeding cut lines are positioned so that said tongues as defined by said feeding cut lines in said label material strip are wider, measured across the strip, than the respective said tongues defined by said feeding cut lines in said backing material strip.

4. The label strip of claim 1, wherein said tongue points in a direction contrary to the direction of advance of said label strip.

5. The label strip of claim 1, wherein each of said label pieces is provided with a plurality of said tongues formed in a row, and said row on each said label piece being oriented transverse to the direction of advance of said label strip.

6. The label strip of claim 1, wherein each of said label pieces further includes cuts for preventing intact removal of a said individual label piece from an article to which it has been applied.

7. The label strip of claim 6, wherein said cuts comprise a cut between the central region of said individual label piece and aiming toward a respective one of a plurality of selected points about the periphery of said individual label piece.

8. The label strip of claim 6, wherein each of said cuts is generally V-shaped.

9. The label strip of claim 6, wherein each of said cuts comprises a linear cut oriented obliquely across said label piece.

* * * * *